United States Patent [19]

Escobosa

[11] 4,244,553
[45] Jan. 13, 1981

[54] HYDRAULIC ACTUATION SYSTEM FOR ENGINE VALVES

[76] Inventor: Alfonso S. Escobosa, 2034 Brittany Pl., Placentia, Calif. 92670

[21] Appl. No.: 909,650

[22] Filed: May 25, 1978

[51] Int. Cl.³ .................... F16K 31/122; F01L 9/02
[52] U.S. Cl. .................... 251/57; 123/90.12; 123/90.15; 60/591; 60/594; 92/86; 251/DIG. 1; 277/3; 277/27; 277/29
[58] Field of Search .......... 60/537, 583, 591, 594; 123/90.12, 90.13, 90.14, 90.15; 92/86; 251/57, DIG. 1; 277/29, 3, 27

[56] References Cited

U.S. PATENT DOCUMENTS

| | | | |
|---|---|---|---|
| 1,692,845 | 11/1928 | Kolb | 251/57 |
| 1,696,984 | 1/1929 | Trbojevich | 123/90.12 |
| 2,072,437 | 3/1937 | Wurtele | 123/90.12 |
| 2,329,662 | 9/1943 | Steiner | 123/90.12 |
| 2,595,775 | 5/1952 | Wrangell | 123/90.12 |
| 2,614,793 | 10/1952 | Storm | 251/DIG.1 |
| 2,621,640 | 12/1952 | Reggio | 251/57 |
| 3,119,592 | 1/1964 | Fraschetti | 251/57 |
| 3,139,077 | 6/1964 | Beucher | 123/90.12 |
| 3,209,737 | 10/1965 | Omotehara et al. | 123/90.12 |
| 3,216,451 | 11/1965 | Smallpiece | 251/DIG. 1 |
| 3,817,228 | 6/1974 | Bywater | 123/90.12 |
| 3,865,015 | 2/1975 | Hankansson | 92/86 |
| 3,895,815 | 7/1975 | Panigati | 251/DIG. 1 |
| 4,106,446 | 8/1978 | Yamada et al. | 123/90.12 |

OTHER PUBLICATIONS

Scanning the Fields for Ideas - G. P. Michelson and L. A. U/C - 12/9/1976, p. 42.

Primary Examiner—Martin P. Schwadron
Assistant Examiner—G. L. Walton

[57] ABSTRACT

This invention relates to an hydraulic actuation system for poppet valves of internal combustion engines. In substance, the system replaces the valve guide and spring assemblies of conventional mechanisms with miniature hydraulic actuators wherein the valve stem now serves as the actuator shaft and the valve guide as the actuator body. The valve actuators are remotely driven in push-pull fashion by fluid supplied by complementary cam followers. As such, interconnecting hydraulic lines replace the push rods and rocker arms of conventional valve driven mechanisms.

6 Claims, 3 Drawing Figures

HYDRAULIC ACTUATION SYSTEM FOR ENGINE VALVES

BACKGROUND

Historically, the valve and valve drive mechanisms have been the least reliable part of the engine assembly. Today, despite roughly half a century of development, the valve system is still in many respects the limiting factor in engine performance and life. The greater emphasis now being placed on fuel economy has not diminished the quest for improved performance for, clearly, reducing engine displacement while maintaining the capability to generate the desired level of power is a logical approach to lower fuel consumption. And if, in the process, the life of the engine can be extended such that the replacement rate of motor vehicles is reduced, the rate in which our mineral and total energy resources are depleted will also be reduced.

For the most part, current advances in valves and valve drive mechanisms are centered on improvements in poppet type valves which are mechanically actuated while being restrained by coil springs. Although refinements are being made to reduce erratic and detrimental motion at high engine speeds, it must still be tolerated to the point where there is danger of failure or excessive wear or where engine combustion processes are significantly degraded.

A lasting solution to this problem can only be in the form of a significant improvement. In this light, the solution offered by the inventor is the hydraulic actuation of the valves.

OBJECTIVES OF THE INVENTION

The object of the system concept is to provide a valve actuation system by which the performance of internal combustion engines can be extended in terms of (1) reduced weight and size, (2) maintenance-free operation, (3) increased dynamic response, (4) reduced design constraints of the engine's cylinder head and (5) superior adaptability to secondary valve functions. In addition, it will become evident in the description of the system that these performance objectives can be realized without major retooling in the manufacture of engines and that, at least potentially, the net cost per engine will be lower. The projected advantage of each of the system objectives will now be elaborated in order that the overall intent of the invention may be better understood.

Weight and Size Advantage—In some engines weight is an important design consideration. This is particularly true of motorcycle engines where weight and center of gravity should both be low in order to enhance good handling characteristics. However, the commonly used four-stroke engines, being generally overhead cam designs, have massive cylinder heads which act to produce a "top heavy" effect. Inasmuch as the hydraulic actuation concept allows in various ways the elimination, replacement and/or relocation of valve drive components, this flexibility may be utilized to contrive a lighter cylinder head and thus alleviate this effect.

Maintenance Advantage—A major intent of the system concept is to provide a valve actuation means which is life-time free of any maintenance requirements. Starting with the cams, it is clear that this component should exhibit less wear if the net inertial load is reduced. This is precisely the case of the proposed system by virtue of the elimination of massive push rods, rocker arms and spring assemblies for which lighter hydraulic "linkages" are substituted. Also, the high valve-closing spring bias which is employed to reduce valve bounce may now be replaced by a lower hydraulic bias which further reduces cam loading.

More importantly, valve wear should be considerably reduced. Firstly, the hydraulically actuated valve is necessarily far better lubricated. Secondly, the valve stem (actuator shaft) is free of cocking forces introduced by the inherent nonsymmetrical termination of the coil spring and by the lateral component of motion of the rocker arm relative to the valve tip. With advancing mileage, these stem loads result in localized wear and channeling between valve face and seat leading to increased heating and eventual valve burning. On the other hand, with purely axial hydraulic forces, wear should be virtually eliminated and perfect alignment and seating of the valve maintained over the life of the engine.

Wear set aside, the durability of the valve should be enchanced by the direct liquid cooling of the stem (actuator shaft). Since control fluid rapidly enters and exits the actuator with each opening and closing event, a heat transfer rate comparable to sodium cooling may be possible.

The question of seal wear and replacement naturally arises in hydraulic systems. Fortunately, the system allows for the use of small diameter components so that all sliding members (pistons, shafts, etc.) can simply be machined to close tolerance allowing tolerable leakages and thus eliminating the need for positive type sliding seals. In fact, it will be shown in the description of the system how finite leakages across various members are utilized to automatically prime the system, synchronize all valves to their prescribed motion and provide continuous fluid circulation for bleeding, cooling and filtering.

Dynamic Response Advantage—In comparison with conventional valve actuation, the operation of the system is more nearly demodromic and promises increased dynamic response. The age old problem of spring intracoil surge which is induced by rapid valve motion and allows valve bounce should be essentially eliminated. Of course intra-fluid vibration is also possible with this system; but with short hydraulic lines, this will occur at much higher frequencies. By the same token, the cam profile may now be designed to open and close the valves faster allowing them to remain full open longer for improved breathing. At any rate, the higher allowable valve response coupled with lower overall system wear offers a definite reliability potential in applications where high engine speed are required.

Design Advantage—Hydraulically actuated valves should significantly reduce cylinder head congestion and subsequent combustion chamber design compromises in applications where fuel injection and/or multiple valves are required. Two examples are cited: the lean-burn engine and the four-valve competition engine. In stratified charge lean-burn engines, a relatively small volume of rich fuel/air mixture is ignited first and the resulting flame spreads out in the combustion chamber containing a very lean mixture. In one basic design a pre-chamber is used wherein the rich mixture is either metered through an extra small intake valve or through direct fuel injection. In another basic design a single, specially shaped combustion chamber is used which requires a fuel/air injector and the precise placement of one or two spark plugs. In either design, compromises are necessary to avoid interference with the overhead valve drive mechanism while preserving accessibility to both valve drive and stratified charge components. With hydraulic actuation, however, the use of small, remotely controlled actuators with control lines routed along the surface of the cylinder head away from critical areas can significantly relax or eliminate conflicting requirements confronting engine designers. And with maintenance-free actuators, only provisions for the replacement of spark plugs and fuel injectors are now necessary. The net result can be a combustion chamber configuration which is better capable of realizing emissions and fuel consumption goals.

In competition engines a high volumetric efficiency is a prime objective and the ultimate valve configuration for this purpose is recognized to be four valves, each inclined 45 degrees with respect to the cylinder center line and alternately arranged (exhaust, intake, exhaust, intake). This geometry provides an hemispherical cylinder head with enough space at the center for locating the spark plug. The corresponding piston head is a flatened dome so that in the top-dead-center position the resulting combustion chamber is characterized by a squish region along the sides and a compact region over the top in keeping with the Ricardo Principle. Although the development of such an engine has been attempted, it simply is not mechanically practical; and only dual in-line designs which substantially back off from the ideal are currently employed. Here again the use of easily oriented, miniature actuators allow design freedom never before possible. The fact that all four valves have different wide angle inclinations is of little concern and the difficulty of individually aspirating four valves per cylinder can be alleviated by accessing the intake valves from the top of the cylinder head where the oil-drenched valve drive mechanism would otherwise be located. In this particular design, the cylinder head cover which would be used to conceal hydraulic, ignition and fuel injection components may now also serve to form a plenum chamber for the intake ports. At any rate, the superior breathing capacity of the configuration supported by the increased dynamic range and improved high speed reliability of the hydraulic actuation system should form the basis for a new standard of achievable power.

Adaptability Advantage—The hydraulic actuation system can be readily adapted to advanced secondary valve functions. One such function is configuring dual engine displacement by closing and reactivating the valves of every other cylinder in the firing order. Here the engine is alternately converted in operation between an N-cylinder engine and N/2-cylinder one depending on power demand. Not surprisingly, the principle by which mode transition is effected with hydraulic actuation can be made identical to that of the current electro-mechanical implementation.

Sonic throttling of the intake valves which has been shown to increase part-load thermal efficiency and tolerance to lean air-fuel ratios appears to be another natural outgrowth of hydraulic actuation. A simple hydro-mechanical scheme in which metered volumes of actuation fluid are diverted to effect a variable lift has been contrived for this purpose.

Still another natural outgrowth is diesel engine exhaust braking. In this system the exhaust valves are hydraulically opened at the end of the compression stroke by fuel injector pressure. Since portions of the hydraulic actuation system can be adapted to perform this function, simplification of the overall system should be possible.

Other objects and advantages which will become evident reside in the details of construction and operation as more fully hereinafter described.

COMPONENT DESCRIPTION

In the following description of the system components and operation, reference is made to accompanying drawings in which.

Figure 1:
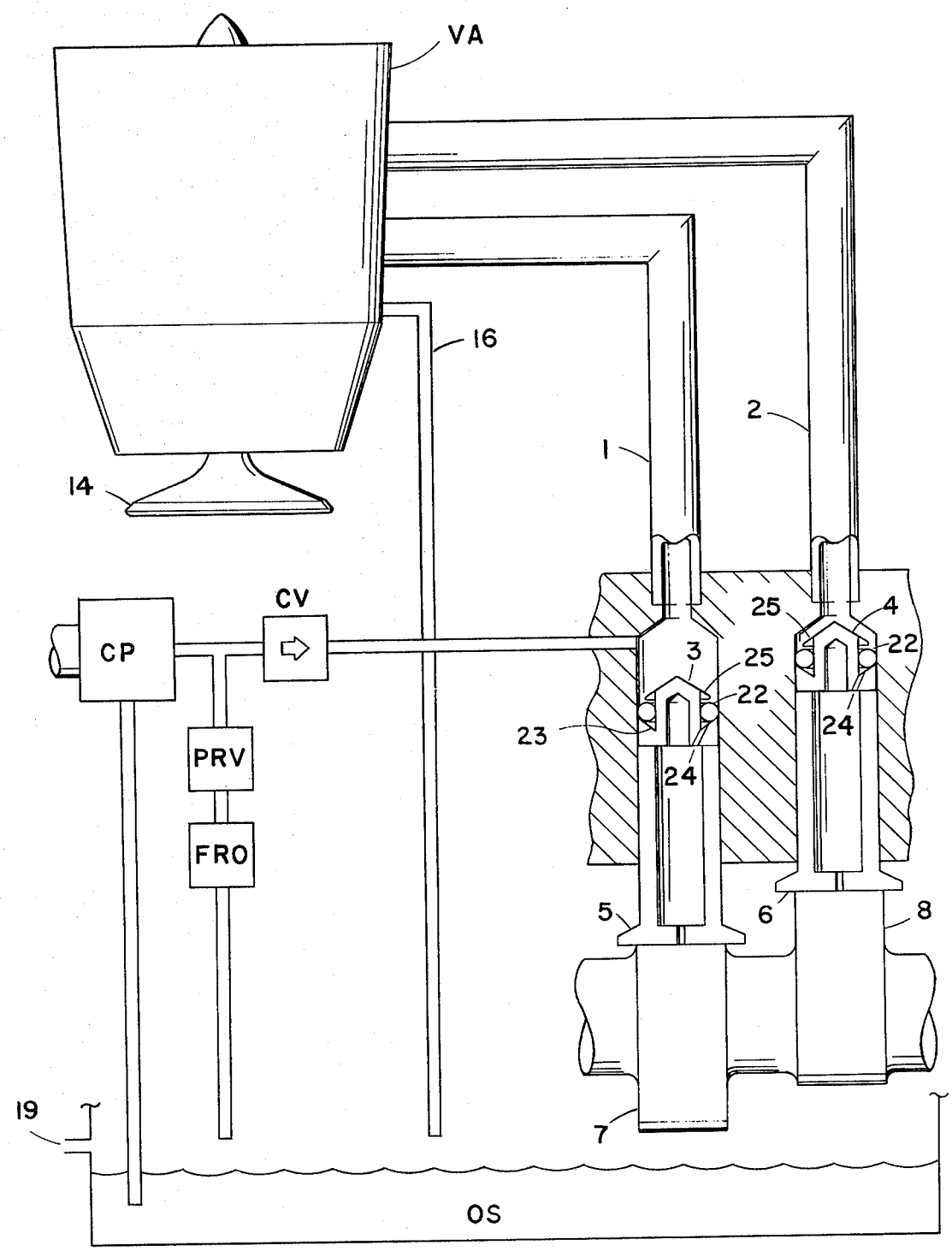
FIG. 1 shows in functional diagram form a one-valve model of the actuation system.

Referring to FIG. 1, there is provided a hydraulic charging pump, CP, from which fluid is made to throttle through pressure release valve PRV in series with flow restricting orifice FRO for the purpose of generating a pressure source that varies nonlinearly with respect to engine speed. This pressure acts on the input side of check valve CV, and with passage of fluid prevents the pressure in the valve-closing control line, 1, from dropping below the desired level. The minimum, idle speed, pressure level is determined primarily by the pressure release valve. This level (typically 150 to 300 psi ) is determined by the particular requirement of the engine exhaust valves which must remain closed during the intake stroke. Pressure levels at higher speeds are determined by the flow restricting orifice as well as the pressure release valve.

Fluid flow leading into valve actuator/port unit VA through control line 1 causes a closing motion in the valve head, 14, whereas that leading into the unit through control line 2 causes an opening motion. Control flow through these lines is provided by valve-closing cam follower piston 3 and valve-opening cam follower piston 4, respectively. These pistons are held in contact with cam follower piston lifters 5 and 6, respectively, by means of pressure in the control lines originating in the charging pump.

Cams 7 and 8 are complementary to each other. Therefore, in the process of being rotated they, in turn, cause complementary opening and closing flows from the cam follower pistons to the valve actuator/port unit.

The primary purpose of the check valve is to prevent high pressure pulses, developed in the valve-closing control line during high speed operation, from reflecting back to the pump circuit. These pulses are developed primarily by the masses of the valve and cam followers as they are made to accelerate and decelerate. During instances of low acceleration, pressure will drop and oil will enter the control line through the check valve to make up for fluid losses.

Figure 2:
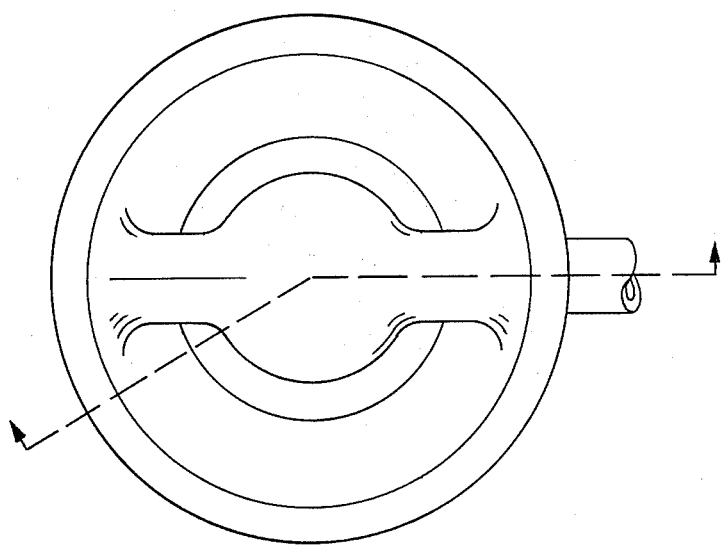
FIG. 2 shows the top view of the valve actuator/port unit.
Figure 3:
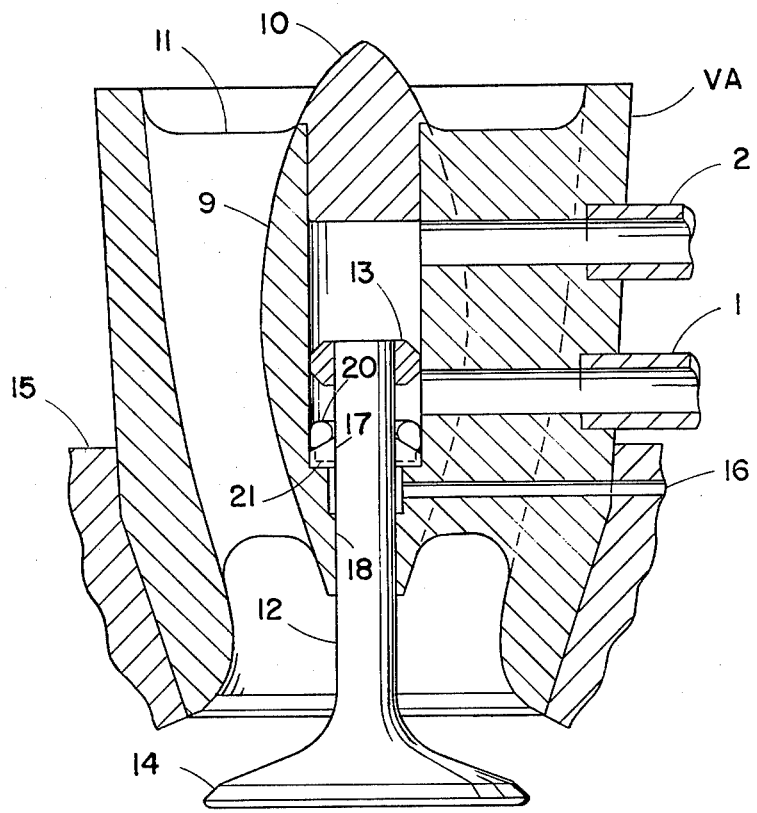
FIG. 3 shows in side elevation a cross section of the valve actuator/port unit.

FIGS. 2 and 3 show the preferred embodiment of the valve actuator/port unit, VA. This unit consists of actuator body 9, actuator end cap 10, flared actuator supports 11, single-ended actuator shaft (valve stem) 12, actuator piston 13, valve head 14, control line 2 leading to the valve-opening port, control line 1 leading to the valve-closing port, a portion of the cylinder head 15 in which the unit is inserted, leakage return line 16 (which siphons leakage from the upper (internal) shaft seal 17 to oil sump OS) and lower (external) shaft seal 18.

Shaft seals 17 and 18 provide a two-stage finite leakage seal configuration. Leakage at the lower shaft seal is prevented by venting the oil sump through line 19 to the intake manifold (low pressure source) eliminating the need for a suction pump in series with the return line.

Continuing there is provided an elastomeric "O" ring 20 and a beveled spacer 17 which also forms part of the upper (internal) shaft seal. The beveled seal spacer has a fluid escape groove 21 which prevents the trapping of fluid behind the ring.

The primary purpose of the elastomeric "O" ring is to provide a static positive seal in series with the upper (internal) shaft seal in order to prevent fluid leakage from the interior of the system during the engine turned-off period. Another purpose is to prevent the valve from gravitating or otherwise moving during the engine turned-off period by providing static friction which exceeds the weight of the suspended mass. The "O" ring with the aid of the inclined surface and groove of the beveled spacer is designed to be pushed away from the sliding surface with normal operating pressures as shown in FIG. 3 and then snap back to its original (depressurized) position and shape to provide sealing and valve latching. Since the elastomeric material is not in contact with a sliding surface, no abrasion-induced wear can take place.

Advantages of the valve actuator/port unit over the conventional means of accessing the valve include the following:

1. Shorter valve stem and, therefore, lighter valves for improved dynamic performance.

2. Shorter valve stem and, therefore, readily cooled valve heads.

3. Shorter valve stem and, therefore, less tendency for the valve to vibrate.

4. Better alignment of the valve and valve seat as the result of the axisymmetric design of the unit.

5. Easy removal and replacement of the valve proper actuator, valve seat and valve. (The cylinder head need not be removed.)

6. Simplification of the cylinder head casting resulting from the elimination of valve-cooling water passages, valve ports and valve seats.

7. Reduced breathing resistance to intake or exhaust gases by reason of axial flow of gases leading into (or out of) the valve head.

8. Elimination of side loading of the valve by reason of axial flow of gases along the back side of the valve head.

Elastomeric "O" ring 22, inclined surface 23, and fluid escape hole 24 shown in FIG. 1 perform the same sealing function as in the case of the actuator. The only difference between these seals and the actuator seal is the reciprocating motion to which the cam followers seals are subjected. Because of this motion, seal retainers 25 are required in order to assure that the "O" rings do not become separated from the cam follower pistons.

Inasmuch as the total system leakage rate can be made low, the oil sump may be utilized as a depth type oil filter wherein fluid/air separation as well as particle sedimentation can take place. A low leakage rate also means that the absolute magnitude in leakage variation with temperature and engine speed will likewise be low. Therefore, the pressure drop across the pressure release valve and the flow restricting orifice can be made predictable with low throttling flow rates. Also, a low leakage rate allows a small displacement charging pump to be conveniently installed at the end of the cam shaft.

During operating of the system, the net leakage across the actuator piston is from the valve-closing chamber to the valve-opening chamber. This holds true when the valve is unseated (by reason of the unbalanced piston areas) and when the valve is seated (by action of the pump circuit which maintains a high pressure in the valve-closing side of the piston). Therefore, unless fluid pressue in the valve-opening side is sufficiently released when the valve seats, the piston leakage leading into this side will cause the pressure to rise to the point where the valve will open. Added leakage for assured valve closure can be easily accomplished by the valve-opening cam follower while in the bottom position. There the diameter of the cam follower cylinder below the level corresponding to the top of the piston finite leakage seal can be machined slightly larger than the diameter above this point. A high reduction in leakage resistance can result with the slightest increase in the corresponding clearances since leakage rate varies with the cube of clearance. Thus, as the valve seats and the valve-opening cam follower piston reaches the bottom position, the control line pressure will drop as the result of a sudden decrease in leakage resistance assuring that the desired net closing force across the actuator piston develops.

In contrast to the cam follower pistons which can center freely relative to the cylinder, the piston lifters are subjected to side loads induced by the cams. Therefore, in the case of the valve-opening cam follower, the piston lifter should not extend beyond the point where the cylinder diameter narrows (or conversely, the length of the piston should be equal to or longer than the lift of the cam) in order to prevent wear above this point.

SYSTEM OPERATION

Having defined and described the system components, the operation of the one-valve system of FIG. 1 can now be described in greater detail. The priming of the system is a logical starting point, particularly since an understanding of this process gives insight to an important feature, namely, the self-synchronization of the valve.

Prior to the priming of the system for an actual engine, it is necessary that all valves be placed in the closed position in order to prevent contact with the engine pistons. This may be done without regard to the angular position of the cam shaft and to the positions of the cam followers relative to their respective cams. In the operational description of the one-valve model, it will be assumed for convenience that the cam followers are initially in contact with the cams and that as the engine is cranked the valve will either be directed to close (an impossibility) or to open (a possibility). In the first case, as turning takes place, air pumped into the valve-closing circuit will become compressed and will begin to leak across the actuator piston to the valve-opening side. In the second case, air pumped from the valve-closing unit will simply allow that pumped into the valve-opening circuit to open the valve. After a few revolutions the air pockets in both circuits will assume pressures and volumes consistent with the motion constraints of the valve, and the valve will become reasonably well synchronized with respect to the cam followers. However, since the valve is repeatedly being opened through a compressible media acting against a progressively higher valve closing bias, the valve lift amplitudes will be less than that directed by the cam followers.

Eventually the air being pumped into the interior of the system through the check valves will be replaced by fluid. As fluid fills the valve-closing side, air leakage across the actuator piston will gradually become fluid leakage and the valve-opening circuit will now begin to be purged of air. Actuation of the valve will now begin to more closely follow the prescribed motion of the cams so that at some point hereafter it should be perfectly safe to start the engine. The subsequent rapid pumping of fluid by the cam followers will enable quick purging of the remaining air.

As the valve is rapidly opened and closed, pressure pulses will develop in both the valve-opening and valve-closing sides of the actuator piston. Therefore, at the end of the open period, a minute gain or loss of fluid volume will occur in the valve-opening side depending on the relative leakages across the actuator piston and the valve-opening cam follower. If a net gain in fluid takes place, the complete closing of the valve will depend on the compressibility of the fluid and the pressure release of this circuit by the valve-opening cam follower. On the other hand, if a net loss takes place, a premature closing of the valve will occur. This may result in a small separation between the valve-opening cam follower and the cam as the cam shaft continues to turn which is taken up as leakage across the piston continues to fill the required volume. Separation is not likely, however, because the finite expansion of the fluid should fill the remaining volume. Thus, as the result of the high pressure maintained in the valve-closing side, the complete and proper seating of the valve is re-established in both cases.

When the engine is turned off and fluid contracts as the result of the cooling, a small amount will be drawn into the interior of the system. However, since positive sealing is quickly established upon depressurization, fluid entry will be substituted by the lifting of one or both cam follower pistons. Obviously, the static friction force inherent in all elastomeric seals should not be set high in the case of the cam followers to assure that the valve is not lifted. Actually the lifting of the valve-closing cam follower piston is preferred over the valve-opening one, since here the slight volume of fluid displaced by the lift is quickly made up by the pump circuit during engine turn-on. To assure this, a light spring can be inserted between the valve-closing cam follower piston and piston lifter.

It should be noted that jarring the valve from the turned off position is impossible, since this requires a sudden transfer of fluid from one side of the valve piston to the other, an impossibility.

VALVE DRIVE OPTIONS

The basic one-valve system can be made to accommodate any size any type of engine. In all engines a valve-opening cam/cam follower unit will be required for each valve. If dual valves are used, a single unit having a stepped piston may still be used. On the other hand, the valve-closing cam/cam follower and check valve can be totally shared, partly shared, or repeated depending on the number of cylinders and the required dynamic response range. In all cases the pump circuit can be expected to be shared.

By way of example, suppose that a two-cylinder engine having two valve-closing circuits (one for the exhaust valves and one for the intake valves) is desired. The required change from the one-valve model is in the two valve-closing cams which must now have two inverse lobes separated by 180 degrees so that each of the two valve-closing cam followers may alternately provide complementary flow to two actuators. The same procedure may be followed for a three-cylinder engine with each of the two valve-closing cams now having three inverse lobes separated by 120 degrees. In either of these engines the two valve-closing cam/cam followers may, in turn, be combined into one unit and the number of inverse lobes on the now single cam doubled. The single cam follower which can now be connected to the pump circuit through a single check valve supplies the required complementary flow to both the exhaust and intake valves. Here valve motion during the period when both an exhaust and intake valve are open is controlled by the two corresponding valve-opening circuits. Another variation which is an extension of this variation replaces the single valve-closing cam/cam follower unit with an accumulator. Here control of the valve motion is entirely dependent on the valve-opening circuits. The latter variation lacks the degree of control stiffness offered by push/pull operation and is highly dependent on the pump circuit pressure in preventing high speed floating of the cam followers. At any rate, a multitude of valve-closing circuit variations are clearly possible which allows tailoring to particular engine requirements.

In four, six and eight cylinder engines, for the case where one (totally shared) valve-closing unit is used, the valve-opening cam/cam follower assemblies of hydraulically actuated valve systems will resemble those of current designs. There will be exceptions as in the case of high performance dual overhead cam engines where it is clear that with hydraulic actuation it is possible to use a single or dual underhead cam shaft and still maintain the desired valve orientation.

In the case of the popular V-8 engine, a valve timing diagram reveals that if the V-arranged valve-opening cam followers are separated by approximately 153 degrees rather than 90 degrees, two of the four cam followers of each opposed cylinder pair can share a single cam. The total number of valve-opening cams can, therefore, be 12 instead of the currently required 16. However, with a 45 degree separation, only 8 cams are required. Similarly, an even-firing V6 engine requires 9 cams with 168 degree separation and 6 cams with 60 degree separation.

It appears from a comparison of similar sections and components of an hydraulic actuation system with those of a conventional system that a cost advantage is evident for automotive engines having eight, six and possibly four cylinders provided the comparison is with conventional engines equipped with hydraulic tappets. Cost comparisons of motorcycle and competition engines appear toss-ups although in the latter case it is irrelevant since performance and reliability are paramount.

Although the invention has been described and illustrated in detail, it is to be understood that the same is by way of example and is not to be taken by way of limitation.

I claim:

1. A system of hydraulically actuated poppet valves wherein fluid supplied by complementary flow sources and replenished by a variable pressure source is conveyed to actuator/port units to effect the opening and closing of engine valves; said flow sources constituting valve-opening and valve-closing circuits incorporating cam driven cam follower units having finite leakage sliding seals; said variable pressure source comprising a pump circuit incorporating a high pressure pump, a shunt connected pressure release valve having a series flow restricting orifice said pressure source applied to the valve-closing circuits through a check valve; said actuator/port units comprising a symmetrically arranged single-ended actuator, a valve member, a valve seat and a valve port with said actuator having a finite leakage piston and shaft sliding seals with the shaft seals, in turn, comprised of interior and exterior seals with leakage from the interior seals returned to the system oil sump; said system of hydraulically actuated poppet valves each incorporating a first retractable elastomeric seal in series with the actuator interior shaft, said first retractable seal under a non-pressurized condition latches each of the valve members during the engine turn-off period, during normal operation said first retractable seal retracts under a pressurized condition to unlatch each of the valve members, thus defining the leakage determined by the interior seals, regardless of the position of each of the poppet valves during the latching and unlatching positions, synchronization with the corresponding cam follower units is always maintained; the cam follower units include second retractable elastomeric seals for the purpose of positively containing the control fluid in the valve-opening and valve-closing circuits, said second retractable seals performs in the same manner as the first retractable seal during the latching and unlatching of the poppet valves; a variable leakage sliding seal in the valve-opening cam follower units allows a net valve-closing force to develop across the actuator piston during the period the valve members must remain closed.

2. The system of claim 1 wherein by fluid supplied by the pump circuit and passed through check valves into corresponding valve-closing circuits and wherein by controlled leakage rates in the actuator pistons and the valve-opening cam follower units, the system is automatically primed, and the valves are synchronized to their prescribed motion.

3. The actuator/port unit as set forth in claim 1, main body of said unit formed as a single axisymmetric piece having a port and valve seat contoured for low axial-flow resistance, a concentric and streamlined actuator supported by two streamlined flanges and extended deep into the port to allow the use of a short valve stem, a slightly tapered periphery of said main body for allowing a tight fit yet easy removal and replacement of the unit.

4. The cam follower unit as set forth in claim 1 constructed in two parts, one a cam follower piston and the other a cam follower piston lifter, in order to allow the cam follower piston to center freely relative to the cylinder.

5. The valve-opening cam follower unit as set forth in claim 1 wherein the diameter of the cam follower cylinder, below the level corresponding to the top of the piston finite-leakage seal when the piston is at the bottom position, is machined slightly larger than the diameter above this point and wherein the length of the piston finite leakage seal is made equal to or longer than the lift of the cam such that a higher level of leakage is effected and maintained allowing a net valve-closing force to develop across the actuator piston during the period the valve must remain closed.

6. The valve-closing cams and associated cam follower unit as set forth in claim 1 wherein the actuation of more than one valve member per valve-closing circuit can be accomplished by sharing the cam follower units, such means provided by multiple inverse lobes on the cams, the number of cam lobes corresponding to the number of valve members shared by its associated valve-closing cam follower unit.

* * * * *